US007765922B2

(12) United States Patent
Ashby

(10) Patent No.: US 7,765,922 B2
(45) Date of Patent: Aug. 3, 2010

(54) DEVICE FOR COMPRESSING BIOMASS TO CREATE FUEL

(76) Inventor: Rusty Stewart Ashby, 2815 Chicopee Dr., North Charleston, SC (US) 29420

( * ) Notice: Subject to any disclaimer, the term of this patent is extended or adjusted under 35 U.S.C. 154(b) by 0 days.

(21) Appl. No.: 12/330,489

(22) Filed: Dec. 8, 2008

(65) Prior Publication Data

US 2010/0005980 A1 Jan. 14, 2010

Related U.S. Application Data

(60) Provisional application No. 61/079,187, filed on Jul. 9, 2008.

(51) Int. Cl.
*B30B 11/04* (2006.01)
*B30B 9/28* (2006.01)
*B30B 15/30* (2006.01)
(52) U.S. Cl. .............. 100/240; 100/100; 100/215; 100/218
(58) Field of Classification Search ................ 100/3, 100/215, 240, 245, 246, 247, 906, 218, 100
See application file for complete search history.

(56) References Cited

U.S. PATENT DOCUMENTS

| 1,515,318 A | * | 11/1924 | Tennebaum et al. ......... 100/246 |
| 3,211,193 A | * | 10/1965 | Anderson .................... 141/73 |
| 3,384,007 A | | 5/1968 | Boje et al. |
| 3,604,345 A | | 9/1971 | Boje |
| 3,687,064 A | * | 8/1972 | Glanz ........................ 100/100 |
| 3,901,139 A | | 8/1975 | Moriconi |
| 4,443,997 A | | 4/1984 | Namdari |
| 4,860,646 A | | 8/1989 | Spiers |
| 4,884,937 A | | 12/1989 | Braunius |
| 5,315,924 A | | 5/1994 | Kruzick |
| 5,393,310 A | | 2/1995 | Wollen |
| 5,632,199 A | | 5/1997 | Molitorisz et al. |
| 5,682,683 A | | 11/1997 | Haimer |
| 6,339,987 B1 | | 1/2002 | Dunaway |
| 6,820,542 B1 | | 11/2004 | Truitt |
| 2004/0045215 A1 | | 3/2004 | Guilfoyle |
| 2006/0037235 A1 | | 2/2006 | Manko et al. |
| 2006/0086419 A1 | | 4/2006 | Aikins et al. |
| 2008/0051614 A1 | | 2/2008 | Ida et al. |

FOREIGN PATENT DOCUMENTS

JP 05200592 A * 8/1993

* cited by examiner

*Primary Examiner*—Jimmy T Nguyen
(74) *Attorney, Agent, or Firm*—Berenato & White, LLC

(57) ABSTRACT

The present invention is a biomass compactor. The device is made up of a frame having a hydraulic compaction cylinder. When the hydraulic control is activated, the compaction cylinder moves forward through a hopper filled with various biomass materials, such as but not limited to, yard waste and food waste products. The compaction cylinder pushes the raw biomass material into the compaction area, thereby compressing the biomass material. When the compaction cylinder is retracted, the hopper can then be refilled and the compaction process repeated as desired up until the point where the compression area is full. The resulting compressed biomass material is removed and can be used as fuel, such as by burning the resulting compressed biomass material in a fireplace or wood burning stove.

3 Claims, 3 Drawing Sheets

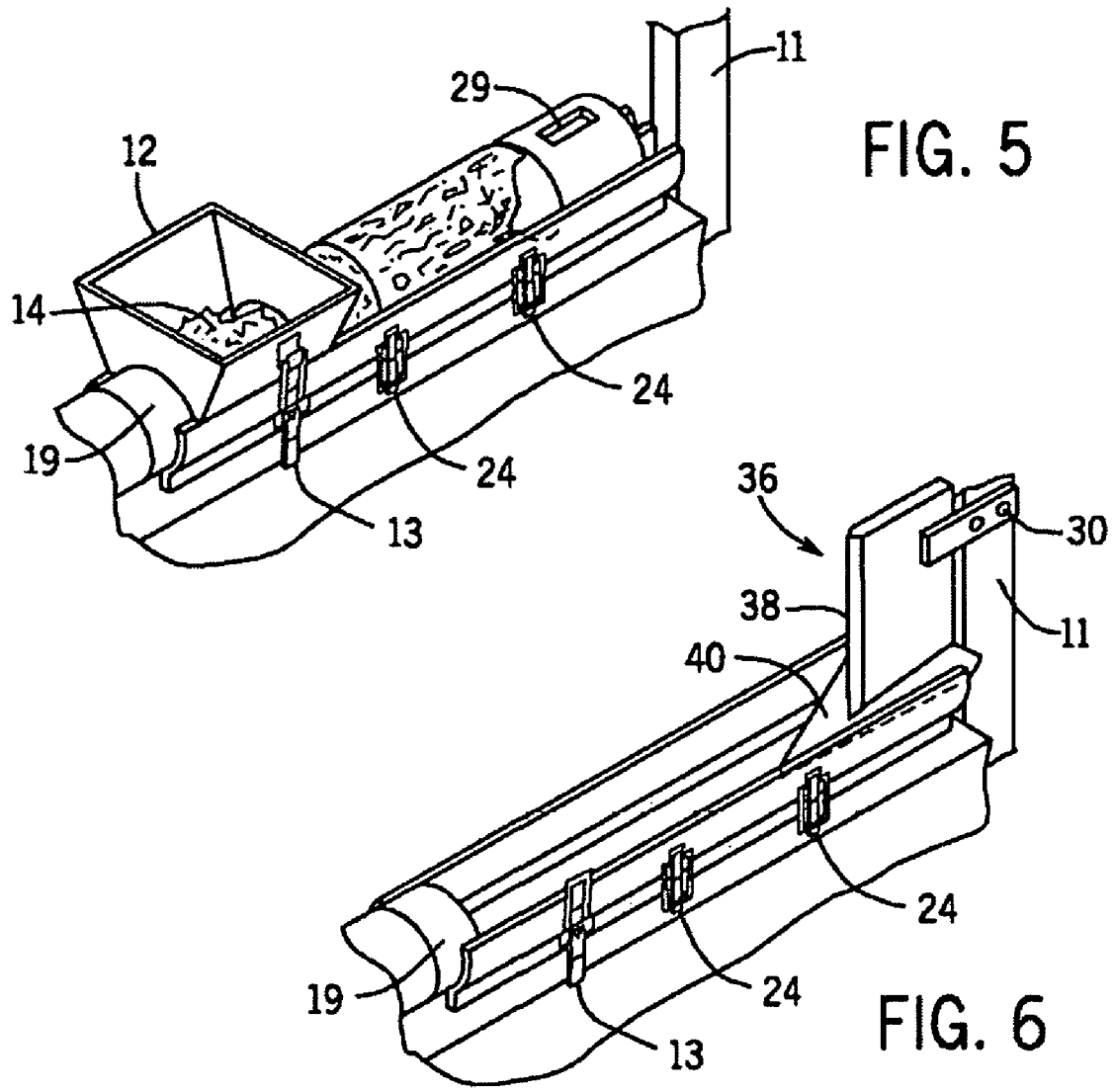
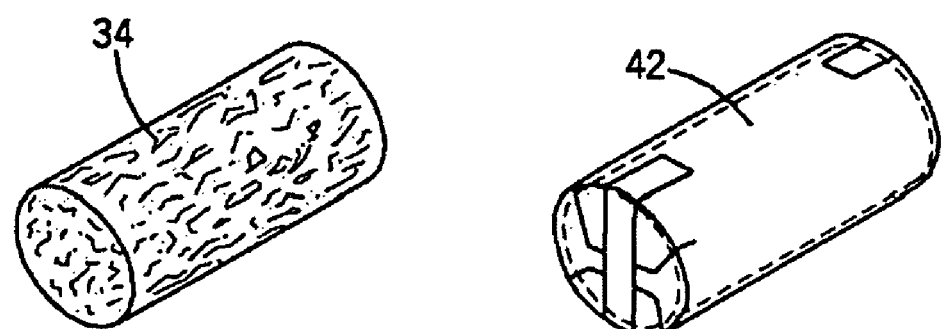

DEVICE FOR COMPRESSING BIOMASS TO CREATE FUEL

CROSS-REFERENCE TO RELATED APPLICATIONS

This application claims the benefit of earlier priority based upon the filing of a provisional application, Ser. No. 61/079,187, which was filed Jul. 9, 2008.

BACKGROUND OF THE INVENTION

1. Field of the Invention

This invention relates generally to a device that is capable of shaping biomass into a log suitable for burning.

2. Background

Compaction devices are known to exist. Many known compaction devices are adapted for industrial use, or are complicated devices that are not intended to be used and, in fact, are not appropriate for use in a home. Other compaction devices, which are intended for and appropriately used in a home environment, are intended to crush or compact metals, such as aluminum cans or plastic bottles. While these and other compaction devices do reduce the volume of unwanted or used waste, they do not transform the unwanted garbage into a useable form. Additionally, known compaction devices do not provide the ability to compact biomasses, such as kitchen and yard waste into a form that could be used for a beneficial purpose. When referring to kitchen waste, this would relate to food package containers, cereal boxes, etc.

It would, therefore, be desirable to have a device that is capable of compressing biomasses. It would also be desirable to provide individuals the ability to recycle and reuse biomass rather than simply allowing the biomasses to decay. Furthermore, it would also be desirable to have a device that would not only compress the biomass into a useable form, but which would also produce an output product that is suitable for use as a fuel.

SUMMARY OF THE INVENTION

The present invention advantageously fills the aforementioned deficiencies by providing a recycling device that compresses biomass into a form suitable for use as fuel.

Generally speaking, the present invention is a compactor having a horizontal frame, which can be mounted on wheels, thereby making it easily portable. Secured to the frame is a hydraulic cylinder to which a compaction cylinder is attached. When the hydraulic control knob is pulled forward the compaction cylinder is then activated and moves forward. As it moves forward it enters a hopper which has been filled with biomass materials, such as but not limited to yard waste, i.e., grass, leaves, etc., food waste products, newspaper, junk mail, magazines, wheat, straw, wood, mulch, wood chips, cotton, stalks, pine straw and pine cones. The compaction cylinder pushes biomass material into the compaction area, thereby compressing the biomass material. When the compaction cylinder is retracted, the hopper can then be refilled and the compaction process repeated as desired up until the point where the compression area is full. The resulting compressed biomass material (sometimes referred to as the "biomass log" or simply the "log") is removed and can be used as fuel, such as by burning the resulting compressed biomass material in a fireplace or wood burning stove.

It is thus an objective of the present invention to provide homeowners with the ability to recycle biomasses, and to further use the compressed biomass output as fuel, thus leading to cost savings associated with the use of freely available biomasses as a means to produce energy.

Finally, it is an object of the present invention to provide a device for compressing biomass that does not suffer from any of the problems or deficiencies associated with prior solutions.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 5 is a perspective view of the invention in use, with parts broken away.

FIG. 6 is a perspective view of the invention in a second mode.

FIG. 7 is a perspective view of the product of the invention.

FIG. 8 is a perspective view of the product of the invention packaged.

DETAILED DESCRIPTION OF THE INVENTION

Figure 1:
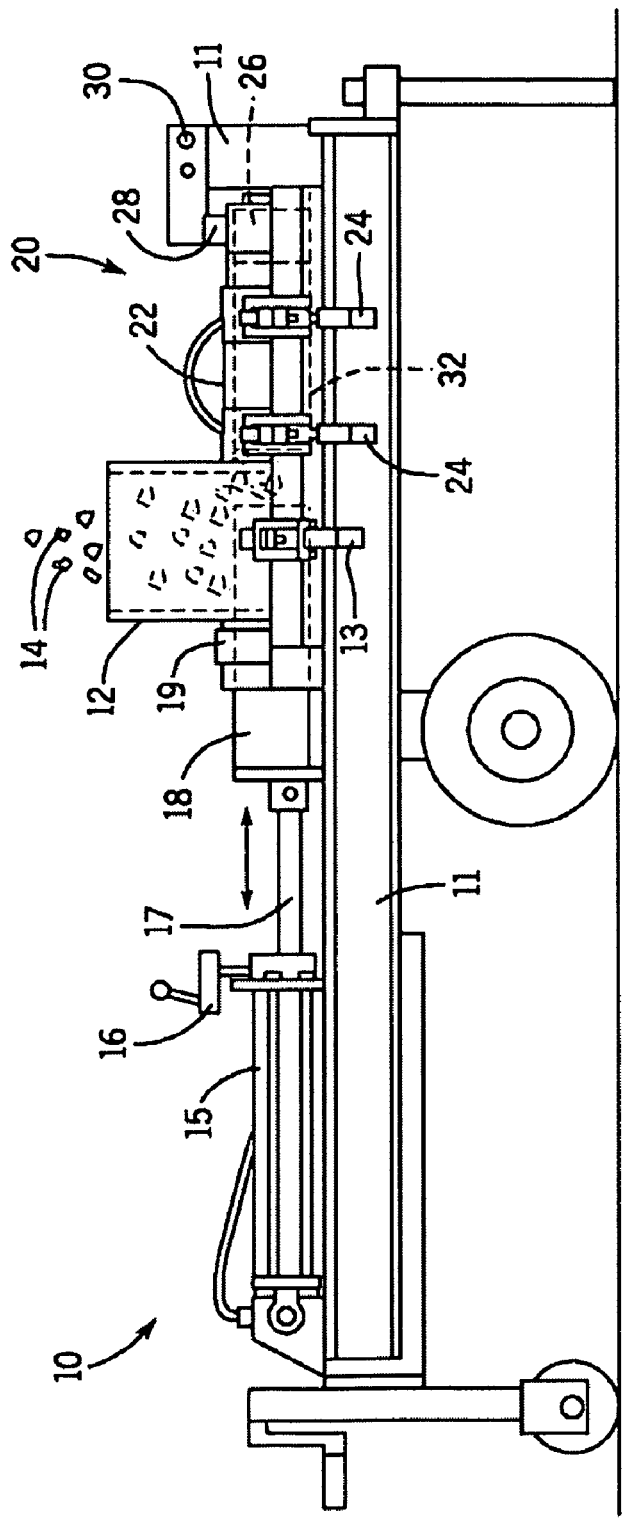
FIG. 1 is a side elevation view of the invention.
Figure 2:
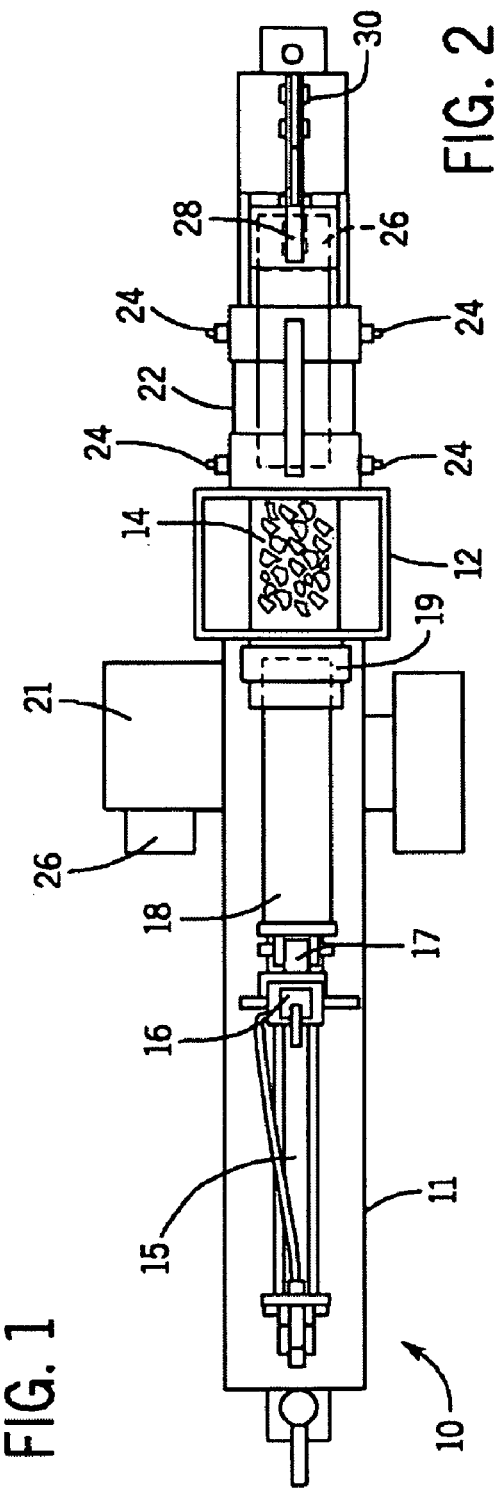
FIG. 2 is a top plan view of the invention.

The present invention is directed to a device used for compressing biomass to create fuel. Turning to the drawings, shown particularly in FIG. 1 and FIG. 2 is an overall perspective of the invention 10 from differing vantage points. Shown is the frame 11, which supports a hydraulic cylinder 15 to which a ram equipped compaction cylinder 18 is attached. When the hydraulic control 16 is pulled forward the compaction cylinder 18 is then activated and moves the ram element 17 forward. As it moves forward it enters a hopper 12 which has been filled with biomass materials, such as but not limited to yard waste and food waste products. The compaction cylinder 18 ram pushes the surge fed material into the compaction area 20 chamber. The compaction area consists of a forming chamber that has been split into two segments. The lower half of the forming chamber 32 is connected to the frame 11, preferably by welding the chamber and frame together. The upper half of the forming chamber 22, supported by pivoting frame 28, is locked down by clamps, preferably toggle clamps 24, with four toggle clamps being preferably used. It should be noted, however, that other clamps and securing devices can be used in place of toggle clamps. When the compaction cylinder 18 is retracted, the hopper 12 can then be refilled and the compaction process repeated as desired up until the point where the compression area is full.

The hopper 12 is locked in place by hopper toggle clamps 13, but can be unlocked and removed as necessary. The hopper toggle clamps 13 are unlocked from the upper half of the forming chamber 22 enabling it to be opened, exposing the compacted biomass material 34. It should be noted, however, that other clamps and securing devices can be used in place of toggle clamps, and the clamps and/or securing devices used for the compaction chamber may be but are not required to be the same as those used for the hopper.

Figure 3:
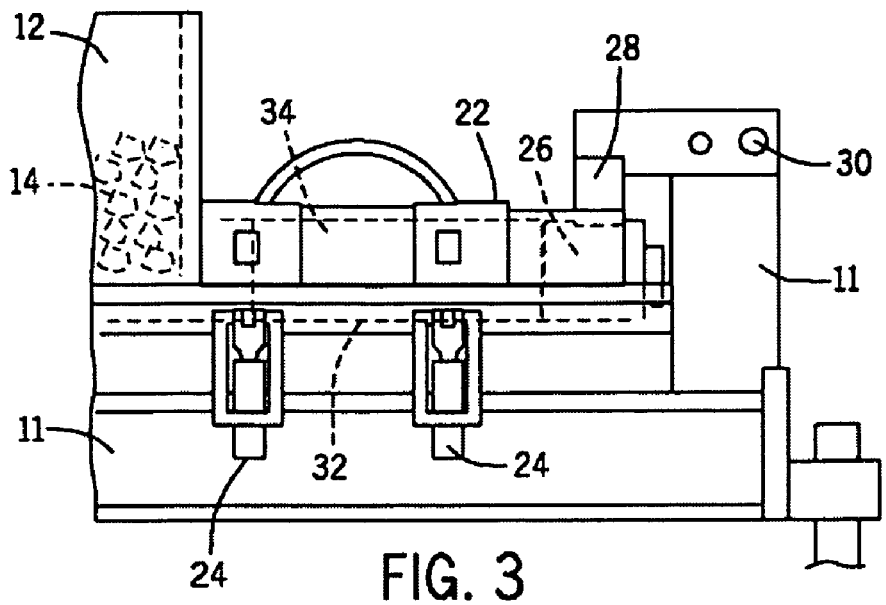
FIG. 3 is a detail side elevation view of the invention.
Figure 4:
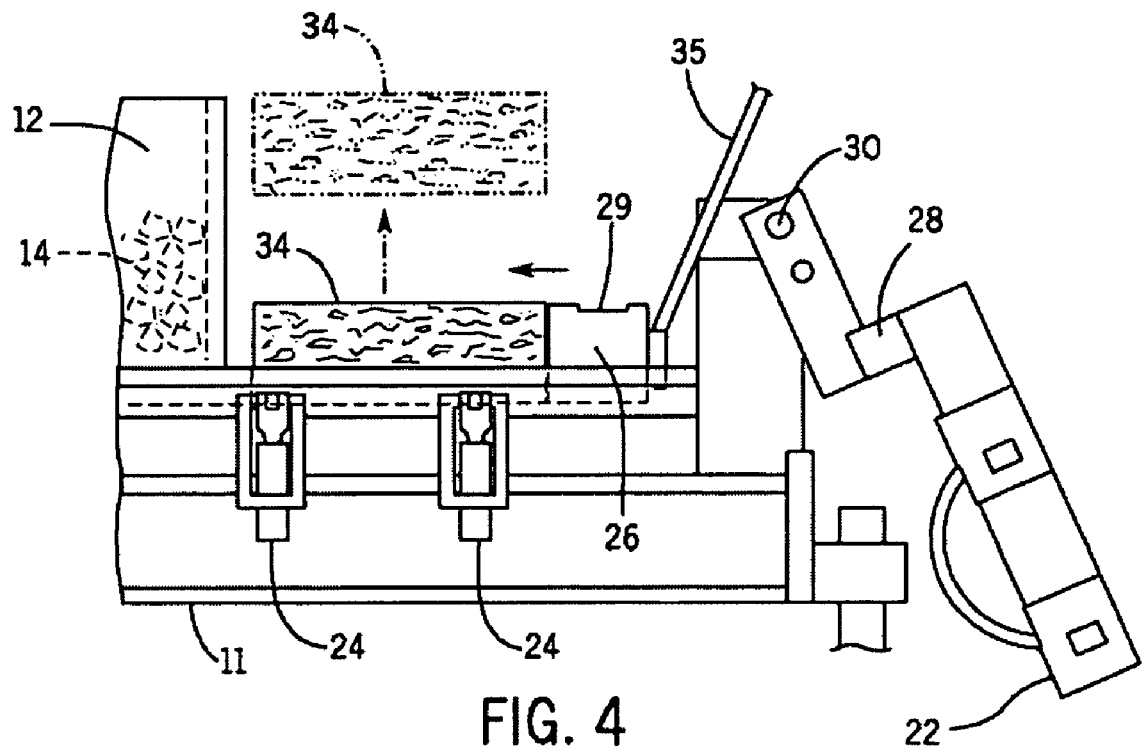
FIG. 4 is a detail side elevation exploded view of the invention.

FIGS. 3 and 4 show a detailed side elevation exploded view of the invention 10. In fact, FIG. 3 and FIG. 4 show the same view, but FIG. 4 depicts the use of a lever 35, such as a crowbar, which is used to remove the compressed biomass material 34 after it has been formed. The lever 35 is inserted into the rear or back slot 29 of the dislodge blank 26. This allows the compressed biomass material 34 to be removed from the lower half of the forming chamber 32. The compressed biomass material 34 can then be wrapped 42 (see FIG. 8) for storage or burned in a fireplace or wood stove, for example. The compressed biomass material 34 could also be cut into pieces prior to wrapping and/or storage, and could be converted into pellets or brickets.

FIG. 5 shows essentially the same view as do FIGS. 3 and 4. Shown in FIG. 5 is the raw biomass material 14 in the hopper 12. In front of the hopper 12 is shown the compaction cylinder sleeve 19, which guides the compaction cylinder (not shown in this illustration). Again shown is a hopper toggle clamp 13, which is used to secure the hopper 12 to the frame 11. Likewise, lower forming chamber clamps 24 are shown securing the lower forming chamber (not numbered in this illustration) to the frame 11.

FIG. 6 shows an optional log splitter 36, equipped with blade 38 and inclined plate 40, which is attached to the upper frame 11 and secured by bolts 30.

To convert the compactor into a splitter, follow the following steps. Step 1. Unlock the toggle clamps from the hopper and set it aside. Step 2. Unlock the toggle clamps from the compactor lid. Step 3. Remove the hinge bolt connected to the upper frame. Lift the compactor lid and set it aside. Step 4. Dislodge blank is not required, set it aside. It has a slotted opening for easy removal. Step 5. You are now ready to install the splitter. The bottom of the splitter is placed exactly where the dislodge blank has been. The splitter can now be bolted to the upper frame. It is required that the hinge bolt and stationary bolt are inserted and tightened. You are now ready to split logs.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A portable home use biomass compactor for creating compacted biomass, comprising:
    a wheeled frame having a hydraulic cylinder mounted thereon for horizontal operation, said cylinder including a ram compacting element extending there from along a rail element mounted to said frame, said rail element including a two part biomass compaction chamber mounted thereon, said two part chamber including an upper moveable chamber part and a lower chamber fixed chamber part, fixed to said rail element, said respective chamber parts being releasably coupled together during operation of said compactor and uncoupled following operation of said compactor;
    a dislodge blank being removably positioned in said compaction chamber in a location opposite said ram compacting element, said dislodge blank having a top slotted opening for easy removal of the dislodge blank;
    a hopper releasably coupled to said rail element in a position along said rail element forward of said fixed chamber part, wherein biomass is surge fed by said hopper into a path of said ram compacting element as said ram compacting element moves toward and into said biomass compaction chamber thereby compacting said biomass against said dislodge blank into compacted biomass; and
    a lever for inserting into a rear of said dislodge blank for allowing removal of said compacted biomass, said dislodge blank being priable against said compacted biomass by said lever to enable removal of said compacted biomass from said compaction chamber following compaction.

2. A portable home use biomass compactor as in claim 1, further comprising:
    at least four toggle clamps releasably attaching said respective upper and lower chambers parts one to the other.

3. A portable home use biomass compactor as in claim 2, further comprising:
    at least two toggle clamps releasably attaching said hopper to said rail element.

* * * * *